Jan. 7, 1947. R. J. WISE Re 22,827

SYSTEM AND APPARATUS FOR FACSIMILE TELEGRAPHY

Original Filed April 4, 1942 4 Sheets-Sheet 1

BY

INVENTOR
R. J. WISE

M. R. Marsh
ATTORNEY

SYSTEM AND APPARATUS FOR FACSIMILE TELEGRAPHY

Original Filed April 4, 1942 4 Sheets-Sheet 2

INVENTOR
R. J. WISE
BY M. Q. Marsh
ATTORNEY

Jan. 7, 1947. R. J. WISE Re 22,827

SYSTEM AND APPARATUS FOR FACSIMILE TELEGRAPHY

Original Filed April 4, 1942 4 Sheets-Sheet 3

INVENTOR
R. J. WISE
BY M. R. Marsh
ATTORNEY

SYSTEM AND APPARATUS FOR FACSIMILE TELEGRAPHY

Original Filed April 4, 1942 4 Sheets-Sheet 4

INVENTOR
R. J. WISE
BY M. R. Marsh
ATTORNEY

Reissued Jan. 7, 1947 Re. 22,827

UNITED STATES PATENT OFFICE 22,827

SYSTEM AND APPARATUS FOR FACSIMILE TELEGRAPHY

Raleigh J. Wise, Dunellen, N. J., assignor to The Western Union Telegraph Company, New York, N. Y., a corporation of New York Original No. 2,394,577, dated February 12, 1946, Serial No. 489,440, June 3, 1943, which is a division of Serial No. 437,719, April 4, 1942. Application for reissue July 24, 1946, Serial No. 685,825

11 Claims. (Cl. 178—6.6)

The present invention relates primarily to facsimile telegraph systems and apparatus and particularly to mechanisms and the control thereof for supplying such facsimile apparatus with and the removal therefrom of message sheets and recording blanks.

This application is a division of application Serial No. 437,719, filed April 4, 1942, "System and apparatus for facsimile telegraphy."

While the principles of the present invention are particularly adaptable for use in conjunction with a combined facsimile transmitter-recorder of the rotating-cylinder type, such as for example that disclosed in Patent No. 2,255,868, granted November 11, 1941, to R. J. Wise et al., and is described in a facsimile system employing such a machine and other rotating cylinder type facsimile machines, it will be evident that the principles of the invention are not limited in application to only these facsimile machines and the system described, but may be applied to various other types of machines and systems.

The transmitter-recorder facsimile machine disclosed in the above-mentioned Patent No. 2,255,868 includes a rotatable drum, and when the machine is used in a receiving capacity a recording blank is wrapped around the drum so that the subject matter received is reproduced on the recording blank by the usual means of a stylus which explores successive areas on the recording blank and marks the same in accordance with signals received. When the machine is employed as a transmitter, the message sheet is wrapped around the cylinder and successive areas of the sheet explored by a photoelectric pickup system and corresponding signals transmitted to a line circuit.

In accordance with the above, one of the primary objects of this invention is to provide selectively controlled means whereby the rotatable cylinder or cylinders of a facsimile machine for example may be supplied with either a message blank or sheet in the conditioning of the machine for the transmission of a message or with a recording blank in order to condition the machine for the recording of a message.

Another object of the invention is to provide for the selective distribution of message sheets and/or recording blanks removed from the rotating cylinder of a cylinder type of facsimile transmitting machine, receiving machine, or combined transmitting and receiving machine.

These and other objects of the invention will be apparent to those skilled in the art as the following description of the apparatus proceeds together with the description of a facsimile system employing such apparatus with reference to the accompanying drawings, in which.

In the present invention the novel facsimile transmitter-recorder disclosed herein is connected by a communication circuit to a communication center equipped with a transmitter, a message recorder, and a monitor recorder. These three pieces of central office equipment are arranged to be connected to any incoming communication circuit having one or more of the automatic facsimile transmitter-recorders of this invention connected thereto. The central office transmitter and message recorder may be combined into one automatic machine which is of the drum changing type similar to that described in the said Patent No. 2,255,868, and the monitor recorder may be of the type disclosed in Fig. 4 of the drawings of Patent No. 2,255,869, granted to G. H. Ridings et al. September 16, 1941. To simplify operation of the system, the monitor recorder may be mechanically driven from the central office transmitter whether or not the latter is combined with the central office message recorder.

Figures 1, 2:
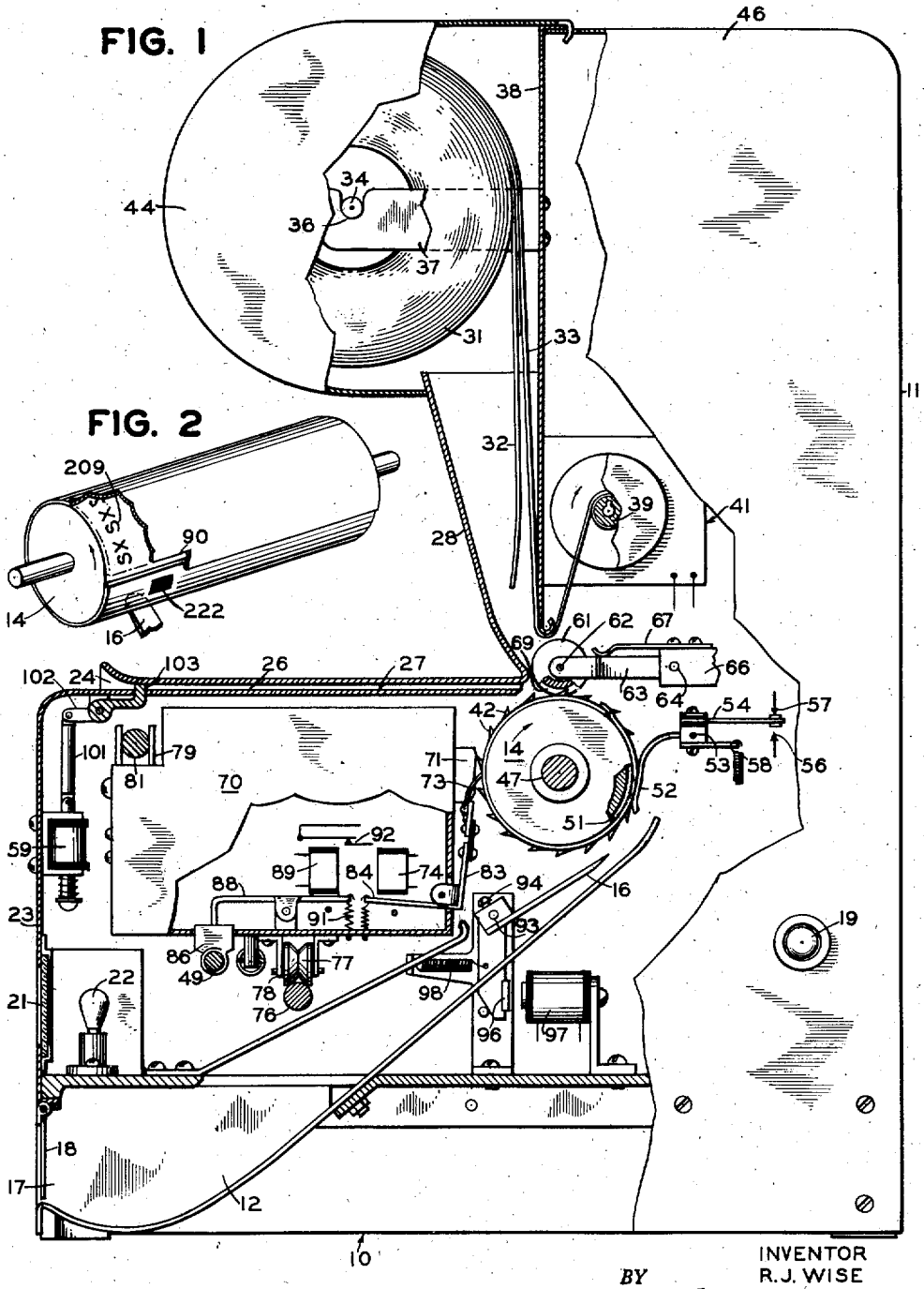
Fig. 1 is an elevational view partly in section of a combined transmitter-recorder constructed in accordance with the invention.
Fig. 2 is a fragmentary detail view in perspective of the copyholder cylinder of the machine of Fig. 1.

The combined transmitter-recorder disclosed in Figs. 1 and 2 may include structural refinements shown and claimed in Patent No. 2,262,715, granted to R. J. Wise et al. on November 11, 1941, for "System and apparatus for automatic facsimile telegraphy," and also in the application of R. J. Wise et al., Serial No. 389,164, filed April 18, 1941, for "System and apparatus for facsimile telegraphy."

The combined transmitter recorder 10 is housed in a box 11 which may be placed in any location accessible to a person authorized to collect and distribute received messages or to a member of the general public having a message for transmission. The box 11 is provided with a bin 12 for receiving message sheets ejected from a copyholding cylinder 14 upon operation of a stripping finger 16. The bin 12 is accessible through an opening 17 in front of the box, which may be provided with a locked closure 18 if desired. The key for this closure may also operate a lock switch used in place of a push button switch 19, provided for use by a person to start the transmitter-recorder when a message is to be transmitted to the communication center.

A series of five signs 21 provided with illuminating lamps 22a to 22e are located in the front panel 23 of the box 11. The lamps are controlled from the central office to illuminate the signs at appropriate times when the machine is used as a transmitter in a manner to be described.

The message sheet receiving slot 24 is provided for the insertion of message sheets bearing subject matter to be transmitted when the machine is to be used as a transmitter. The slot 24 communicates with a chute 26, which may be formed as shown between the inwardly directed upper part 27 of the panel 23 and the horizontal portion of an angularly bent cover plate 28 which protects the paper feeding mechanism.

These externally accessible portions of the equipment are all that need be manipulated and observed in operating the machine as a transmitter. The recording functions of the machine are controlled solely from the central office and access thereto is not needed except for purposes of adjustment, when required.

The upper portion of the box 11 houses the feeding mechanism for successively delivering individual recording blanks to the copyholding cylinder 14. As illustrated, the paper feed includes a roll 31 of individual blanks 32 supported, preferably in overlapping relationship, as shown in the copending application, Serial No. 389,164, above referred to, on an elongated belt 33 of any suitable material, the end of the belt being secured to a mandrel 34. The belts and the blanks supported thereby are rolled together around the mandrel to form the blank supply roll 31.

The opposite ends of the mandrel may be conveniently supported in notches 36 in a pair of reel supporting bracket arms 37 mounted on the upper front panel 38 of the box 11. The belt 33 passes downwardly around the lower edge of the panel 38 and thence to a belt takeup reel 39 which is in driving engagement with a motor (not shown) contained within the housing 41. Unwinding of the belt 33 and the blanks 32 releases them one at a time, permitting each blank to drop onto the copyholding cylinder 14, provided with teeth 42 as disclosed and claimed in Patent No. 2,262,715, referred to above. A hinged cover 44 gives direct access to the reel 31, and a side panel or cover plate 46 may be removed to facilitate removal of the belt 33 after it has been wound on the mandrel 39. It will be understood that the structural elements and indicating devices disclosed in the application Serial No. 389,164 above referred to may be associated with the paper supply reel 31.

Figure 3:
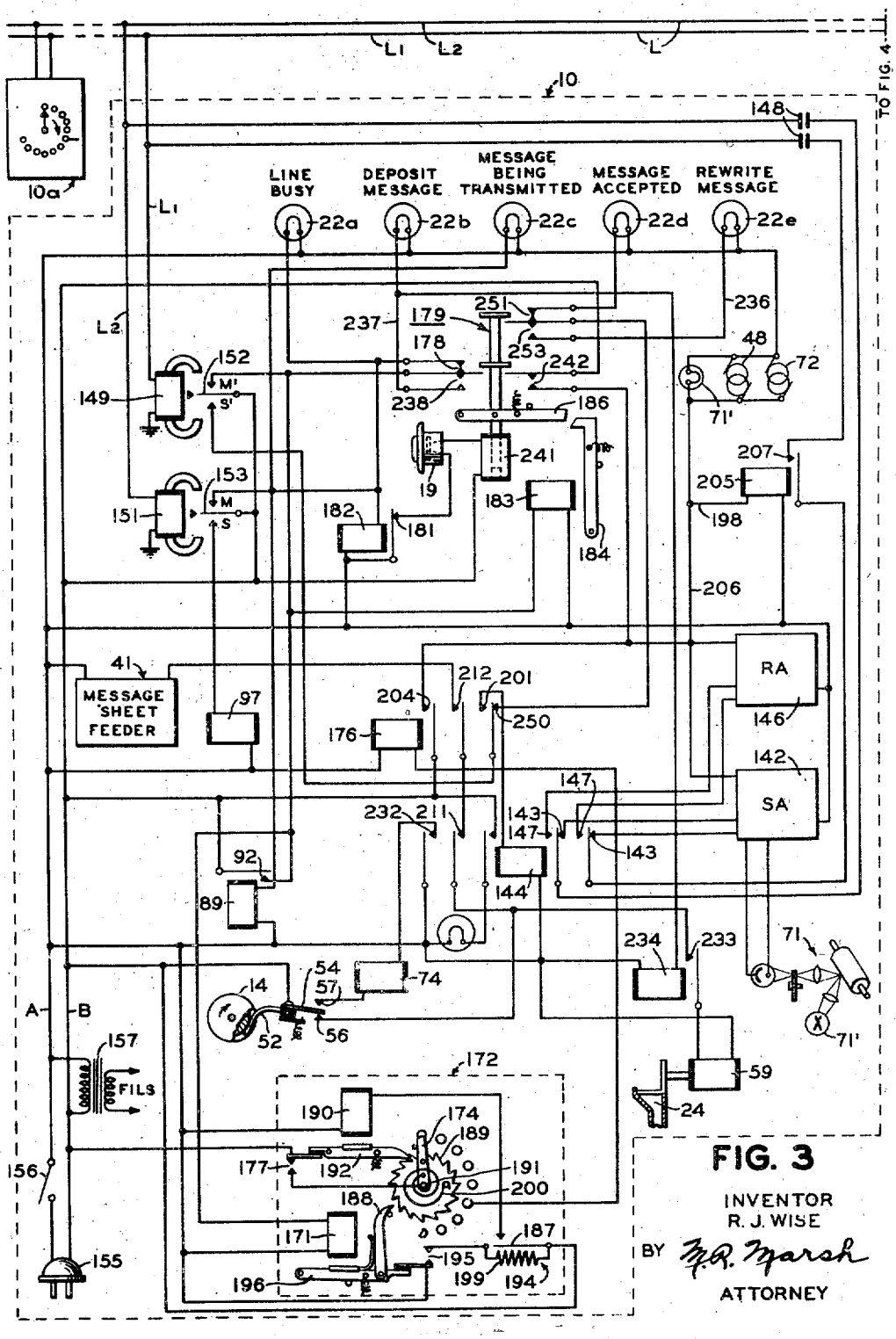
Fig. 3 is a wiring diagram showing a circuit arrangement for controlling and operating the combined machine of the present invention.

The copyholding cylinder 14 is mounted on a shaft 47 supported in suitable bearings and driven from a motor 48, indicated diagrammatically in Fig. 3 of the drawings, which also drives a lead screw 49 in a well-known manner.

A peripheral groove 51 formed in the cylinder and receives a finger 52 secured to a rock shaft 53 rotatably mounted at each end in any suitable manner in the frame of the machine 10. The rod 53 carries a switch arm 54 which cooperates with a pair of contacts 56 and 57. A spring 58 normally presses the finger 52 into the groove 51. Obviously, when a message sheet of any kind is in position on the cylinder 14, the finger 52 is held out of the slot, thus raising the switch arm 54 into the position shown, affording a convenient means for controlling the locking magnet 59 of the chute 26 and the tape reel motor which is operatively connected to the mandrel 39.

A presser roller 61 is rotatably mounted on a stem 62 projecting outwardly from a bracket arm 63 pivoted at 64 to a stationary portion 66 of the machine frame. A spring 67 resiliently urges the roller 61 into engagement with the periphery of the cylinder 14. The roller 61 is grooved at 69 to accommodate the teeth 42. The roller 61 in conjunction with the teeth 42 serves to draw either a recording blank 32 or a message sheet bearing subject matter for transmission onto the copyholding cylinder 14.

A scanner carriage 70, housing and supporting the optical transmitter scanning device 71 including a chopper motor 72 (Fig. 3), the recording stylus 73 and the stylus operating magnet 74, is supported for scanning movement longitudinally of the cylinder 14 on a rod 76 by a beveled roller 77 mounted in brackets 78 on the bottom of the box. An inverted U-shaped bracket 79 in the upper portion of the box slidably embraces a guide rod 81. The stylus 73 is carried on a pivoted arm 83, the projecting end 84 of which is the armature of the stylus magnet 74.

A half-nut 86 is located beneath the scanning box for vertical movement into and out of engagement with the feed screw 49. This range of vertical movement is provided by securing the half-nut 86 to a pivoted arm 88, one end of which serves as an armature for the half-nut magnet 89. A spring 91 serves to maintain the half-nut out of engagement with the lead screw until the magnet 89 is energized. A pair of contacts 92 are brought into circuit-closing engagement when the half-nut magnet 89 is energized. Scanning movement of the carriage 70 also occurs when the half-nut magnet 89 is energized.

The circumference of the recording cylinder 14 is preferably such that, when a blank 32 is wrapped around the cylinder for scanning, its edges overlap slightly to provide a smoother path for the recording stylus and to prevent its contacting the drum. In order to facilitate stripping the blank from the drum after scanning, each blank is preferably notched in one corner, as at 90, in Fig. 2, in such a way that, when the blank is on the cylinder, the notch provides an open space between the edges at one end. This space permits the stripping finger 16 to be inserted through the open space and under a blank for the purpose of stripping it from the cylinder. If desired, the message sheets to be inscribed with subject matter for transmission may be shorter than the circumference of the cylinder 14, providing a space between their edges when in position to facilitate operation of the stripper finger 16. The portion of the light reflective drum which is exposed between the edges of the sheet in either case may be used in conjunction with the optical scanner 71 to derive a framing signal. Also, a contact arm may bear on the cylinder and make contact with the exposed cylinder for the purpose of providing a framing signal. The stripper finger 16 is adjustably secured to a rock shaft 93 by a set screw 94. The rock shaft 93, journaled in any suitable manner in the frame of the machine 10, carries the armature 96 of a stripper magnet 97. A return spring 98 maintains the stripper finger out of engagement with the cylinder 14 until the magnet 97 is energized.

In operation of the mechanical features thus far described and assuming that the machine is to be used as a recorder, the motor associated with the blank feeding mandrel 39 is energized over a circuit to be described in connection with Fig. 3 of the drawings, or over any desired circuit which includes the contact 56 and the switch arm 54. A blank 32 will be released and wrapped around the cylinder 14, whereupon the circuit controlling the motor will be interrupted. During the scanning operation, the feed screw 49 is rotated from the motor through the feed screw driving gears to produce the necessary scanning movement of the scanning carriage 70 and the stylus 73 longitudinally of the rotating cylinder. When scanning is completed, or at any desired time, the half-nut 86 is disengaged from the carriage feed screw, permitting the carriage to be returned to its starting position by a strand or cord under tension secured to the carriage, as shown in Patent No. 2,262,715. Upon completion of a scanning operation, the magnet 97 may be energized, causing the stripper finger to strip the message sheet from the cylinder so that it drops into the bin 12.

When the machine is to be operated as a transmitter, the lock switch or push-button 19 is operated, following which the chute lock magnet 59 is energized in any desired manner, either locally at the machine 10 or from a remote point with which communication is desired. The armature of the magnet 59 is connected by a link 101 to a bell crank 102 which carries a bar 103 normally obstructing entrance to the chute 26. Insertion of the message sheet in the proper manner may be insured by beveling one corner of the blank for cooperation with an arrangement such as is disclosed in Patent No. 2,262,715, referred to above. When the sheet in position on the cylinder 14 bears subject matter for transmission, the optical scanning device 72 will be in operation with the stylus 73 retracted.

Figure 4:
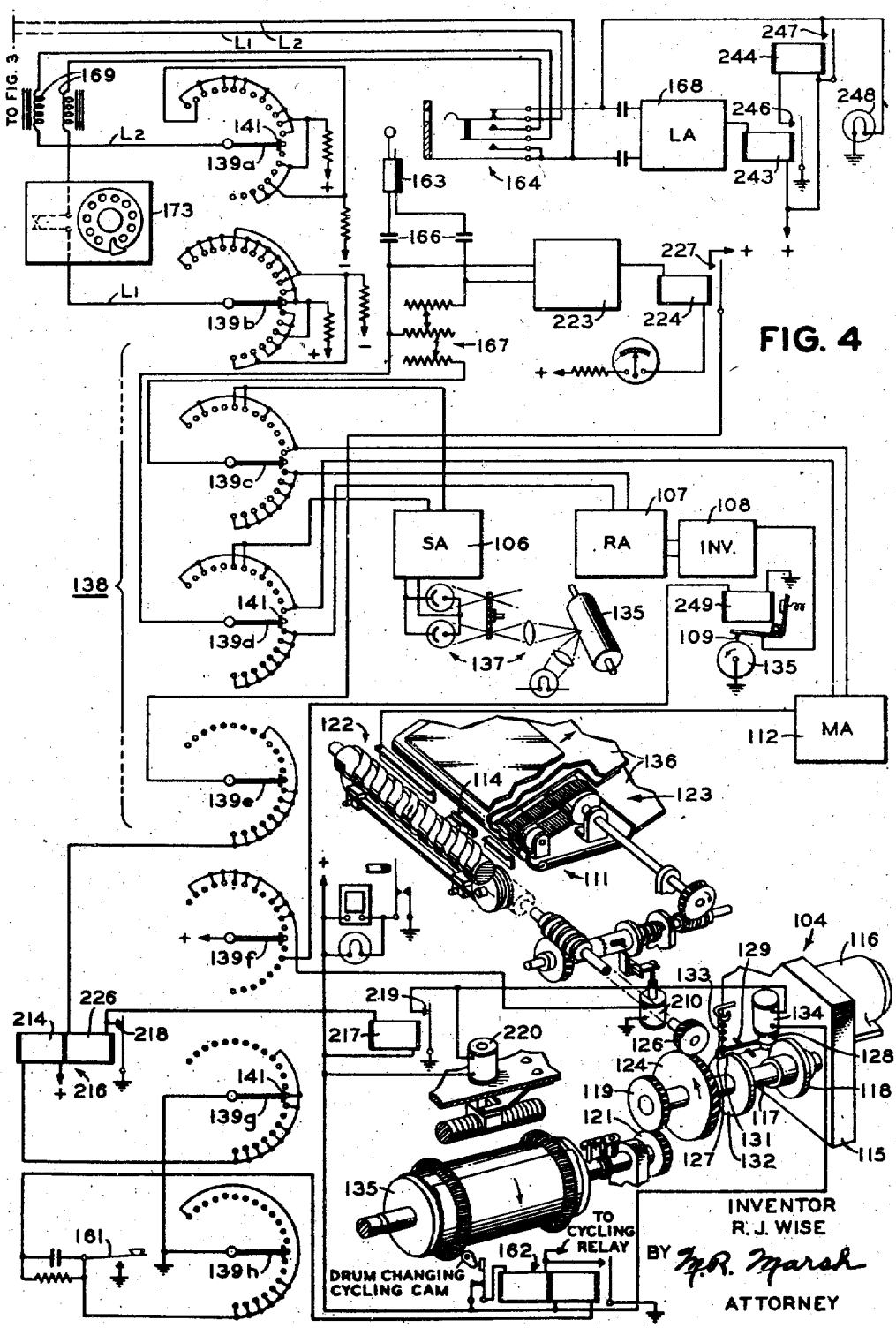
Fig. 4 is a wiring diagram showing the central office equipment for controlling and operating a number of machines embodying features of this invention.

The transmitting and recording equipment 104 installed at a central office for interconnection with one or more of the machines 10 is shown diagrammatically in Fig. 4 of the drawings. A suitable machine of the automatic drum changing type combining transmitting and recording functions is shown in complete detail in Patent No. 2,255,868, referred to above. Separate amplifiers 106 and 107 are provided for the transmitting and recording functions, respectively, of the machine 104. A signal inverter 108 feeds the recording stylus 109. The monitor recorder 111, as stated above, is disclosed in Fig. 4 of Patent No. 2,255,869. An amplifier 112 feeds the recording styli 114 of the monitor recorder. It will be understood that any type of facsimile equipment may be employed at the central office. However, the arrangement of apparatus to be described is quite convenient and represents a desirable embodiment of the system of this invention. The combined transmitter-recorder 104 is driven through a gear mechanism 115 by a motor 116 which operates in synchronism with the motor 48 of the machine or machines 10 and drives a power shaft 117 through a constantly engaged friction clutch 118. The shaft 117 drives the transmitter-recorder 104 through any suitable means, such as the gear and pinion combination 119 and 121, diagrammatically shown. The stylus moving mechanism 122 and the paper feed mechanism 123 of the monitor recorder are also driven from the shaft 117, for example, by a worm and worm wheel combination 124 and 126, also represented diagrammatically in Fig. 4 of the drawings. The shaft 117 is locked against rotation by a tooth or pawl 127 on an armature 128 pivoted at 129 which engages a notch 131 formed in a disc 132 which is secured to the shaft. A spring 133 serves to withdraw the tooth 127 from the notch 131 upon deenergization of a phasing or framing magnet 134. The gear ratios of the worm and worm wheel combination 124 and 126 are selected so that a copy-holding drum 135 of the transmitter-recorder 104 rotates once while a recording stylus 114 of the monitor recorder traverses its recording strip 136. This arrangement is employed, as it simplifies phasing or framing of subject matter transmitted from one of the machines 10. The blanks upon which incoming messages are to be recorded and the message sheets bearing subject matter for transmission to the machine 10 are mounted on the copyholding drums 135 which are inserted in the transmitter-recorder apparatus 104 one at a time, as shown and explained in Patent No. 2,255,868. The recording drum in operative position is rotated by power supplied from the shaft 117 and during rotation the marking stylus 109 or a light spot from an optical transmitting scanner 137 scans the message sheet in a direction parallel to the axis of the copyholding drum. Mechanism similar to that disclosed in the patent is provided for removing a copyholder drum with its attached message sheet after a scanning operation.

The transmitting and recording amplifiers 106 and 107 and the monitor amplifier 112 are connected to the contact studs of the fifth and sixth levels of a rotary switch 138 made up of eight levels. Each level is provided with twenty-one contact studs and a movable contact arm. The eight contact arms are designated 139*a* to 139*h* and are moved simultaneously. Each is provided with a bridging wiper 141 whereby connection is made with each of the studs before the connection with the preceding stud is broken. The contact arms 139*a* to 139*h* of the switch 138 normally remain in the "neutral" position (Fig. 4) when the system is idle and are moved in a counterclockwise direction, as shown in Fig. 4, from the neutral position over thirteen studs when a message is to be transmitted to a machine 10, and in the opposite direction from the neutral position over eight studs when the central station attendant is responding to a call from one of the machines 10 and is taking the steps necessary to record an incoming message.

The communication circuit connecting a single machine or a plurality of machines 10 and the central office is shown as a line L comprising a pair of conductors L1 and L2, which are used simultaneously for the transmission of the alternating current facsimile signals or message impulses and the direct current control signals by which selection and operation of a machine 10 is obtained.

When a machine 10 is in use as a transmitter, the facsimile signals originate at the optical scanning device 71 including a light source 71' which is connected to an amplifier 142, as shown in Fig. 3, the output circuit of which is connected to a pair of contacts 143 of a relay 144. When the machine 10 is in use as a recorder, the incoming facsimile signals are applied to a receiving amplifier 146 and to the stylus 73 by way of make contacts 147 of the relay 144. The tongues of the relay which cooperate with the contacts 143 and 147 are connected through a pair of blocking condensers 148 to the line conductors L1 and L2. The purpose of the blocking condensers is to isolate the alternating current facsimile signals from the direct current control signals. The polarity of the direct current potentials which are applied to the conductor L1 is controlled by the apparatus at the central office for the purpose of operating a polar relay 149 connected to this conductor at the machine 10. Similarly, the polarity of the direct current potential applied to the conductor L2 is controlled by the apparatus at the central office for the purpose of operating a polar relay 151 connected to this conductor at the machine 10. Each of these polar relays is of the three-position type, whereby the tongue is moved to one extreme contact in response to the polarity of potential, to the other extreme contact in response to the opposite polarity of potential, and to a mid position disengaged from both of the extreme contacts in response to a no-current condition. The tongue 152 of the relay 149 cooperates with contacts M′ and S′. The tongue 153 of the relay 151 cooperates with the contacts M and S.

It should be understood that a number of machines 10, as stated above, will normally be connected to a single communication circuit in a party line system, and that each machine 10 is adapted to be locked against operation when any other machine on the same line is operating, as will be described hereinafter, and as is fully set forth in Patent No. 2,262,715.

The operation of the complete system will be described in connection with Figs. 3 and 4 taken together. It is assumed that power is supplied at the machine 10 by connecting a suitable source of alternating current 155 through a switch 156 to the bus bars A and B. The switch 156 is kept closed to maintain the heaters of the amplifiers 142 and 146 fed from the transformer 157 in condition for immediate operation. The motors 48 and 72, the plate supply for the amplifiers and the light source or other active element of the optical scanner are controlled from the central office following operation of the push button 19 or selection of the machine by the central office.

Operation of the system to select and communicate with a particular machine 10 will first be described. The attendant at the central office inserts the copyholding drum bearing the message to be transmitted in position in the transmitter-recorder 104 by operating a key 161 (Fig. 4). This corresponds to the key 227 disclosed in Fig. 3 of Patent No. 2,255,868 and operates the drum changing relay 162. The drum changing relay 162 is also controlled by the contact arm 139*h* of the rotary switch 138. A plug 163 is inserted in the line jack 164 of the line L to which the desired machine 10 is connected. This connects the line conductors L1 and L2 through a pair of blocking condensers 166 and through a power level adjustment pad 167 to the movable arms 139*d* and 139*c* of the rotary switch and disconnects the line amplifier 168 and its associated equipment, which is not needed at this time, from the line L. The line conductors L1 and L2 are also connected through a pair of inductances or choke coils 169 to the control signaling apparatus comprising the contact arms 139*b* and 139*a* of the rotary switch.

The contact arm 139*b*, in its neutral position, rests on a contact stud to which the positive pole of a suitable source of direct current signaling potential is connected. Referring to Fig. 3, it will be noted that line L1 controls operation of the three-position relay 149 and, when a positive potential is applied to this relay, its tongue 152 cooperates with the contact M′ to complete a circuit through the stepping magnet coils 171 of a selector switch 172. The connection to line L1 at the central office includes a dialing device 173 of a well-known type which causes impulses in the nature of interruptions of a steady current to pass over the line to the stepping magnet 171. In impulsing devices of this kind, the dial usually winds a spring which drives an interrupter consisting of a cam engaging the impulse springs. The line circuit is normally closed, and the impulse so-called is a brief interruption of the line current. These impulses or current interruptions are effective to step the switch arm 174 of the selector one point for each impulse. With the selector diagrammatically shown by way of example in Fig. 3, insertion of the plug 163 into the jack 164 at the central office will cause the switch arm 174 to move to its second contact stud. To select the machine 10 of Fig. 3, the dial will be manipulated by dialing No. 4, which will produce four successive interruptions, stepping the switch arm to the fifth contact stud to which the operating coil of a relay 176 is connected. The system is preferably so designed that when positive potential is removed from the line L1, it is applied to line L2 to maintain the selection of the machine by way of the make contact 92 of the switch associated with the half-nut magnet and energization of its relay 176. Stepping of the selectors of other machines connected to the line L occurs, but no selection will result, as their relays 176 will not be operated because of the presence of contacts 177.

The effect of the positive potential maintained on the line conductor L1 or on the line conductor L2 is to maintain the busy signal lamp 22*a* illuminated in all the machines connected to the line L. The circuit of the signal lamp 22*a* with positive potential applied to L1 may be traced from the bus bar B through the contact tongue 152 and contact M′ of relay 149, the break contacts 178 of a multicontact switch 179 to bus bar A. The circuit for the signal lamp 22*a* with positive potential applied to L2 may be traced from the bus bar B through the make contact 92 of the switch associated with the half-nut magnet 89, the break contacts 178 of the multicontact switch 179 and the lamp 22*a* to the bus bar A. The push button 19 at the selected machine 10 and at the other machines connected to the line L is rendered ineffective by a break contact 181 of a relay 182 which is connected in parallel with the signal lamps 22*a* and 22*c*. When the calling plug at the central office is inserted in the line jack, placing a plus potential on line L1, bus bar A is connected to one terminal of the magnet 183 through the tongue 152 and contact M′ of the polar relay 149, the other terminal being connected to the bus bar B whereby this magnet becomes energized to attract its armature 184. As the facsimile communication process is carried out in a manner to be described, the other terminal of the locking magnet 183 is connected to the bus bar B through the make contact 92 of the switch associated with the half-nut magnet 89 when positive potential is connected to the line L2. The hooked portion of this armature moves beneath the armature 186 of the multicontact switch 179 to lock it in the upper or off position shown. This occurs at the other machine on the line L as well as the selected machine 10.

The selector arm 174 is shown as being stepped by a pawl 188 which engages the teeth of a ratchet wheel 189 carried by a shaft 191 to which the switch arm 174 is secured. A pawl 192 also engages the teeth of the ratchet wheel and maintains the selected position of the arm 174 while the stepping magnet coil 171 is deenergized. A coil 190 is provided for withdrawing the pawl 192 from the teeth of the ratchet when it is energized in a manner described below. One side of this coil 190 is connected to the alternating current bus bar A, the circuit being completed under conditions described below to the bus bar B through a thermal time delay switch 194. The coil 199 of the thermal switch 194 is energized through a pair of cooperating contacts 195, the movable one of which is carried by the pivoted armature 196 of the stepping magnet 171. With this arrangement, the magnet coil 190 is normally deenergized, even during the selecting operation, as the time of closure of the contacts 195 during a stepping pulse is insufficient to cause heating of the thermostatic bar 187 of the thermal time delay switch 194. When the selection is completed, energization of the stepping magnet 171 is maintained, which maintains the circuit through the heater element 199 by way of the contacts 195, for a sufficient period to effect closure of the contacts of the thermal switch, thus energizing magnet 190. The pawl 192 is thus retracted so that the ratchet wheel 189 is free to return to its normal position under the influence of the torsion spring 200 when the central office attendant has completed the steps to be described of transmitting a message to the machine 10 and checking its receipt.

The relay 176, which is energized upon selecing the machine 10 by the dial 173, completes a circuit through its make contact 201, which circuit includes the coil of the send-receive relay 144 and the contact S′ of the polar relay 149. This circuit enables the central office attendant to control the transmitter and recorder functions of the machine 10 by reversing the polarity applied to the line L1. When the negative pole of the signaling current source is connected to the line L1, relay tongue 152 moves to the contact S′, thereby energizing the relay 144 to connect the receiving amplifier 146 to the lines L1 and L2. The make contact 204 of relay 176 serves to control the connection of the amplifiers 142 and 146 across the alternating current bus bars A and B and, also, energizes a relay 205 over the conductor 206 which closes the circuit from the amplifiers to the line L at its make contact 207. This relay is included for connecting the amplifiers to the line only when power is applied to the machine so that, in party line operation, only the machine in use will be bridged across the line, and the signal will not be weakened by the unnecessary connection of other machines on the line. The cylinder driving motor 48 and the light chopper motor 72 of the optical scanner 71 are also energized over the conductor 206 when the relay 176 is energized by selection of the machine.

The rotary switch 138 (Fig. 4) is moved from the neutral position counterclockwise to the first position to obtain a positive check of the selection of the desired machine 10. Positive potential is maintained on L1 by the contact arm 139*b*, and positive potential is connected to L2 by the arm 139*a* whereby the half-nut magnet 89 of the selected machine is energized to scan a distinctive mark 209 (Fig. 2) which is repeated around the periphery of the copyholding cylinder 14. In the example shown, the mark 209 takes the form of letters "SX," and it will be understood that the copyholding cylinders 14 of the other machines available for selection will also be provided with distinctive marks differing from each other. The contact arms 138*c* and 138*d* of the rotary switch 138 in its first position connect the lines L1 and L2 to the amplifier 112 of the monitor recorder 111 by way of the blocking condensers 166. The marks 209, in this instance "SX," will be recorded on the web or strip 136 of recording paper in the monitor recorder. The paper feed mechanism of the monitor recorder operates, since the relay 210 is deenergized at the contact arm 139*f*, and the latch 129 is withdrawn from the notch 131, since the arm 139*g* opens the circuit of the locking coil 214 of the relay 216. It will be noted that, inasmuch as the marks are repeated upon the periphery of the copyholding cylinder 14, phasing of the machine 10 with the monitor recorder 111 is not necessary at this time, as one or more of the marks will be reproduced in their entirety. The rotary switch 138 is maintained in its first position until the central office is satisfied that the desired machine 10 has been selected.

The rotary switch 138 is next moved to its second position to secure a message blank 32 on the copyholding cylinder of the selected machine. This is accomplished by placing a negative potential on conductor L1 and maintaining the connection of the conductor L2 to the positive pole of the signal source. At the machine 10 this energizes the relay 144, incidentally connecting the selected party's receiving amplifier 146 to the line, but it has no function at this time. The half-nut magnet 89 remains energized, causing the stylus to feed, but this action is also incidental. Energization of the relay 144 in the manner just explained completes a circuit from the bus bar A by way of the switch arm 54 and the cooperating contact 56, a make contact 211 of the relay 144 and a make contact 212 of the relay 176 to the driving motor of the message feeding device 41. The message blank 32 is thereby applied to the copyholding cylinder 14 in accordance with the description above, which raises the finger 52 from its groove and breaks the circuit which was made at the contact arm 54 and contact 56, stopping the driving motor of the sheet feeding device 41.

The next active step, which is the fifth position of the rotary switch, phases the selected machine 10 with the combined monitor and transmitter-recorder at the central office, and to do this it is necessary to apply positive potential to the conductors L1 and L2. However, to insure the maintenance of communication with the selected machine 10, two transition steps of the rotary switch 138 are included. The third position reverses the polarity of conductor L1 and holds conductor L2 positive to avoid losing the selected party. The fourth position opens the connection to the conductor L2 with the signaling source, thereby spacing back the scanning carriage 70 of the selected party's machine 10. If, in the fifth or phasing position mentioned above, a black line on the blank 32 is used extending all the way across the blank instead of a black spot of limited area in a definite position, the back spacing step provided by the fourth position will not be necessary, as the phasing signal will be generated at all points in the longitudinal travel of the carriage 70.

When the rotary switch 138 is passing over its fourth position to its fifth or phasing position noted above, a coil 214 of a relay 216 is energized at this time by way of contact arm 139*g* and thereby energizes a relay 217 by applying ground at a make contact 218. In the fifth position of the rotary switch, the circuit of the coil 214 is opened; however, the relay 214 stays up, since its coil 226 is energized from ground at make contact 218, switch arm 139e and the make contact 227 of the phasing relay 224. The relay 217 energizes the phasing magnet 134 at its make contact 219 and also energizes the half-nut magnet 220 of the transmitter-recorder section 104 of the central office equipment. This steps the transmitter-recorder 104 and also the monitor recorder 111 until the scanning light spot at the machine 10 passes over the non-reflecting mark 222 (Fig. 2) on the recording blank in position on the recording cylinder 14 at the machine 10. This causes a drop in the signal fed to the phasing amplifier 223, resulting in substantial deenergization of the relay 224, which opens the circuit of the locking coil 226 of the relay 216 at the make contact 227. Deenergization of the locking coil 226 of the relay 216 opens the circuit of the relay 217, resulting in release of the relay 217, starting the shaft 117 to drive the monitor recorder 111 in phase with the machine 10. Operation of the carriage of the machine 104 is incidental. If the exposed portion of the reflective cylinder is used for the purpose of deriving a framing signal at the machine 10, the phasing relay may be of the high current type provided with a break contact instead of a make contact. The signal level will be higher when scanning the bright drum than when scanning the less reflective surface of the message blank.

As the amplifier 112 of the monitor recorder 111 is connected to the line L at this time by the contact arms 139c and 139d of the rotary switch 138, a portion of the blank will be scanned, thereby checking positively application of the blank to the copyholding cylinder of the selected machine 10 by a record on the web 210.

The sixth and seventh positions of the rotary switch 138 are carriage space back and transition steps, respectively. In the sixth position the positive pole of the signaling source is connected to line L1 by way of the contact arm 139b, and the line L2 is unconnected at this time. In the seventh position positive potential is maintained on the line L1, and the line L2 is also connected to the positive pole of the source of signaling potential by way of the contact arm 139a.

Transmission from the central office to the selected machine occurs at the eighth position of the rotary switch 138. The contact arm 139b connects L1 to the negative pole of the source of signaling potential, and the contact arm 139a connects the line L2 to the positive pole of the signaling source. The negative potential on line L1 moves the contact tongue 152 of the relay 149 to its contact S', operating the send-receive relay 144. The positive potential on the line L2 which is maintained from the previous step causes the carriage 70 of the selected machine 10 to feed. The stylus magnet 74 is energized at this time from the bus bar A through the arm 54 and contact 57 of the paper control switch, the operating coil of the stylus magnet, a make contact 232 of the relay 144 to the bus bar B. The rotary switch is left in its eighth position until the message on the copyholding drum at the transmitter 104 has been completely scanned, after which the rotary switch is moved through its ninth and tenth positions to position eleven.

The ninth and tenth positions are transition and carriage space back steps, respectively. In the ninth position of the rotary switch a positive potential is applied to lines L1 and L2. In the tenth position the line L2 is opened, which permits the carriage 70 of the selected machine to return to its initial position.

The eleventh position of the rotary switch is effective to permit the central station attendant to obtain a record of all of any portion of the subject matter which was recorded on the message blank at the selected machine in the eighth position of the rotary switch. Positive potential is connected to the lines L1 and L2 which, in accordance with the previous description, deenergizes the send-receive relay 144 to connect the sending amplifier 142 to the line and also to cause engagement of the half-nut with the lead screw 49 to propel the carriage 70. The rotary switch is maintained in this No. 11 position until the record appearing on the monitor recorder satisfies the attendant that the message has been received.

The twelfth position of the rotary switch maintains L1 positive and connects line L2 to the negative pole of the source of signaling potential, which moves the contact arm 153 of the three position relay 151 against its S contact to energize the peel magnet to remove the blank 32 from the drum. The switch arm 54 of the selected machine 10 comes in contact again with the contact 56, thereby preparing the circuit which places a new blank in position upon the next operation of the relay 144, in accordance with the previous description. This contact also connects the magnet 59 of the chute locking mechanism across the bus bars A and B. However, this circuit is interrupted at this time at the make contact 233 of a relay 234, the operating coil of which is connected from the bus bar B to the bus bar A in parallel with the deposit message signal lamp 22b over the conductor 236. The conductor 237 for feeding the lamp 22b is connected to the make contacts 238 of the multi-contact switch 171 which are closed only when the push button 19 is operated by a person desiring to operate the machine 10 as a transmitter. The relay 234, therefore, permits the chute 24 to open only when the machine 10 or the machine 10a is operative as a transmitter and the copyholding cylinder 14 does not contain a message sheet. Also, in the twelfth position of the rotary switch 138 its contact arm 139g energizes the coil 214 of the relay 126, thereby to stop the copyholding drum of the transmitter-recorder 104 and energize its half-nut to effect a carriage return. The contact arm 139h energizes the relay 162 to eject the copyholding drum from the machine 104 in the manner described in Patent No. 2,262,715 referred to.

The thirteenth position of the rotary switch is similar to the first position. The monitor recorder amplifier 112 is connected to the communication circuit L, and the selected machine 10 is operated as a transmitter by placing a positive potential on the lines L1 and L2. Transmission from the machine 10 need be continued only until a record is obtained of the distinctive mark 209 on the copyholding cylinder.

The central station attendant may now remove the plug 163 from the jack 164 which turns off the selected machine 10 by deenergizing the stepping magnet coil 171, permitting the pawl 188 to release the ratchet wheel 189. The magnet 190 is energized at this time through the thermal time delay switch 194, thereby keeping the pawl 192 from engagement with the teeth of the ratchet wheel at this time. After a short time interval, the thermostatic bar 189 of the switch 194 cools and opens the circuit of the magnet 190 which permits the pawl 192 to drop in place in readiness for the next operation of the selector.

When the contact arm 174 of the selector is returned to its normal position, the relay 176 is deenergized, which disconnects the power supply from the amplifiers at the make contact 204 of the relay, thereby stopping the motors and disconnecting the amplifiers. The relay 205 is deenergized, which disconnects the sending amplifier 142 from the lines L1 and L2 for the reasons stated above.

The rotary switch 138 at the central office is preferably returned to its neutral position when the operator removes the plug 163. However, if the switch is left in the thirteenth position inadvertently, selection is possible, since the positive pole of the signaling source is connected to L1 when the plug is next inserted to select a machine 10.

If the central office attendant is dissatisfied with the appearance of the record obtained on the strip 136 of the monitor recorder when the rotary switch was in its eleventh position, he may move the rotary switch to position twelve to remove the unsatisfactory copy and return it to the second position to place a fresh blank on the machine and then re-run the transmitter at the central office. Before doing this, he may, if he so desires, write the words "second transmission" or words of similar import on the original message mounted on the copyholding drum of the transmitter so as to apprise the person removing the received message from the bin 12 at the machine 10 that two of the record sheets to be found there are duplicates. This will avoid any confusion which may result if the first transmission is so poor that it cannot be deciphered and will be a clear indication that the transmission has been repeated.

The steps of the entire process of selecting and transmitting a message to the machine 10 will be accurately recorded on the web 136 of the monitor recorder 111 and may be preserved at the central office for accounting and other purposes.

Any one of the machines 10 may be operated as transmitters in a manner similar to that set forth in detail in Patent No. 2,262,715, referred to above. The rotary switch 138 is, therefore, provided with eight steps which are covered by the contact arms 139*a* to 139*h* when these contact arms are moved in a clockwise direction from the neutral position.

To use any one of the machines 10 as a transmitter, the patron or other authorized person operates the push button 19 or its equivalent, thereby energizing the operating magnet 241 of the multicontact switch 179. This results in closure of the make contacts 242 which perform the same function as the make contact 204 of the relay 176. The amplifiers of the machine are energized at this time, and the driving and light chopper motors 48 and 72 are started. An alternating current signal is generated by the optical pickup device 71 which is received by the previously mentioned line amplifier 168 at the central office. The output of this amplifier energizes a relay 243 which in turn energizes a relay 244 by way of a make contact 246. A make contact 247 of the relay 244 lights a supervisory lamp 248 to apprise the central station attendant that a call is to be answered and also connects the positive pole of a signaling source, which may be the signaling source previously mentioned, to line L1.

The positive potential on the line L1 moves the contact tongue 152 of the relay 149 to its contact M', thereby illuminating the deposit message lamp 22*b* over the closed contacts 238 and also locking the switch 179 by energizing the locking magnet 183.

The patron will now insert in the slot 24 a message sheet inscribed with the subject matter to be transmitted, the slot being open at this time by reason of the energization of the relay 234 over the conductor 236. When the message sheet is wrapped on the copyholding cylinder 14, the switch arm 54 interrupts the circuit of the chute locking magnet 59 which was maintained at the contact 56.

The central station attendant, responding to the signal lamp 248, inserts the plug 163 in the jack 164, which disconnects the line amplifier 168 but maintains L1 positive over the contact arm 139*b*. The receiving amplifier 107 at the central office is maintained in communication with the line L over the contact arms 139*c* and 139*d* of the rotary switch 138. The attendant may now move the rotary switch 138 clockwise from the neutral position to its first position, which is, as regards the polarity of L1, the same as the neutral position. L2 is maintained open. The coil 214 of the relay 216 is energized by way of the contact arm 139*g* to prepare the phasing circuits originating at the make contact 218.

If a copyholding drum bearing a record blank is not in position in the central office recorder, the key 51 may be operated to insert a copyholder in the machine. However, one will usually be present if the machine has been previously used as a recorder, and the message drum feeding magazine of the machine is provided with copyholding drums having message blanks.

The attendant will now move the rotary switch 138 to its second position if he has not immediately done so after inserting the plug 163. In the second position of the rotary switch, line L2 is connected to the positive pole of the signal source, line L1 being maintained positive. The contact tongue 153 of the relay 151 moves to its M contact, engaging the half-nut 86 to start the scanning process at the machine 10. The lamp 22*c* of the message being transmitted sign is illuminated. Also, in this position of the rotary switch, the holding coil 214 of the double current relay 216 is deenergized so that this relay may respond to the drop in carrier current energy which occurs when the spot of light from the light source in the optical transmitter 71 passes over the black spot on the message sheet in position on the cylinder 14. The stylus 109 is brought in contact with the record blank by a stylus magnet 249 which is energized at this time by way of the arm 139*f* of the rotary switch.

Recording is permitted to proceed until the central station attendant observes that the entire subject matter has been recorded by the machine 104, whereupon he moves the rotary switch 138 to its third position, which energizes the relay 162 to remove the copyholder drum bearing the recorded message from the machine 104. The coil 214 of the relay 216 is energized to stop the scanner of the machine 104, and communication with the machine 10 is maintained by maintaining a positive potential on line L1. Its scanner is returned by opening the line L2.

The recording process may be repeated by again moving the switch to the second position if the central station attendant so desires. A fresh copyholder drum 135 will be in position in the machine 104, and the tongue 153 of the relay 151 will again move to its M contact to energize the half-nut magnet 89.

If the central station attendant is satisfied with the quality of the received message, he moves the rotary switch to its fourth position, which applies negative potential to the line L2 to move the contact tongue 153 of the relay 151 to its S contact, which energizes the peel magnet 97. The rotary switch is turned to the eighth position. In passing over the seventh position, the lines L1 and L2 are opened, which shuts down the machine 10, and in the eighth position negative potential is applied to the line L1, which lights the lamp 22*d* of the message accepted sign. The circuit for this may be traced from bus bar A, contact S′ of relay 149, a break contact 250 of relay 176, closed contacts 251 of the multicontact switch 179 and the lamp 22*d*. The plug 163 may be removed from the jack 164 and the rotary switch turned to its neutral position in preparation for the next operation at the central office.

If, after repeating the recording process, the central station attendant is satisfied that a good recording cannot be obtained, or if the message is illegible, he may move the rotary switch to the sixth position, which will apply negative potential to the line L1 to move the contact arm 152 of the relay 149 to the contact S′, thereby illuminating the signal lamp 22*e* of the rewrite message sign by way of the contacts 253 of the multicontact switch 179, which is maintained closed by keeping the line L2 positive. The rotary switch is then returned to the deposit message position in readiness to again receive the message or subject matter, which must be reinscribed by the patron upon a fresh message sheet.

Figure 5:
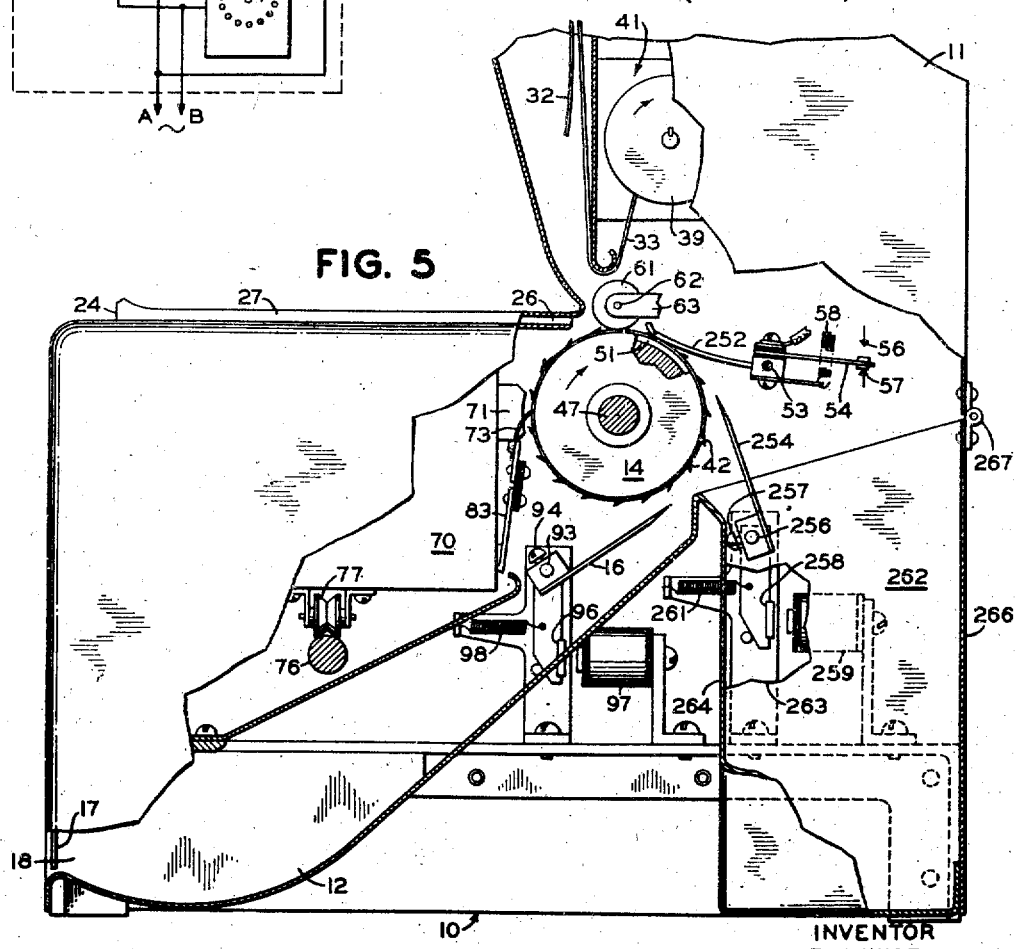
Fig. 5 is a fragmentary view similar to Fig. 1 of a modified machine.

Fig. 5 of the drawings illustrates a modification of the transmitter-recorder of this invention provided with means for selectively distributing message sheets removed from the copyholding cylinder. In the illustrative embodiment of Fig. 5, two electromagnetically operated message sheet removing devices are shown for selectively distributing message sheets into one or the other of two compartments. It will be understood by one skilled in the art that a number of angularly spaced message sheet removing devices may be provided, together with a compartment or receptacle associated with each device, and that any desired means for selectively operating these message sheets may be employed.

The machine of Fig. 5 is substantially the same as the machine 10 of Fig. 1, and therefore like parts are designated by the same reference characters to facilitate identification of these parts. The copyholding cylinder 14 is positioned as before to be fed with blanks 32 or message sheets manually introduced into the chute 26 by way of the slot 24. The switch arm 54 is operated by an arm 252 similar to the arm 52 of Fig. 1 which cooperates with a groove 51 in a copyholding cylinder 14. The contacts 56 and 57 are shown as being interchanged in position, since the arm 252 lies above the cylinder 14. The stripping finger 16 is effective upon energization of the magnet 97 to remove a message sheet from the copyholding cylinder so that it is deposited in the bin or compartment 12. Access to message sheets in the compartment 12 is obtained through the closure 18 which, if desired, may be provided with any suitable type of lock.

An additional stripping finger 254 is provided, which is adjustably secured to a rock shaft 256 by a set screw 257. This rock shaft is journaled in any suitable manner from the sides of the machine 10 and carries the armature 258 of a stripper magnet 259. A return spring 261 maintains the stripper finger out of engagement with the cylinder 14 until the magnet is energized. The magnet 259 may, as shown, be mounted at one side of the machine, and to the rear of the stripper magnet 97 which operates the stripper finger 16.

A compartment 262 having side walls 263, one of which is shown, and a front wall 264 is provided for receiving message sheets ejected from the copyholding cylinder 14 upon operation of the stripping finger 254. Access to the compartment 262 is obtained through a closure member 266 hinged at 267 to the rear panel of the box 11 which houses the entire machine 10. The closure member 266 may also, if desired, be provided with a lock. By selecting locks for the closures 18 and 266 which are opened by different keys, it will be noted that message sheets of any kind removed by the stripper finger 16 will be accessible only to a person provided with a key for the closure 18, and likewise message sheets of any kind removed by the stripper finger 254 will be accessible only to a person provided with a key for the closure 266.

Figure 6:
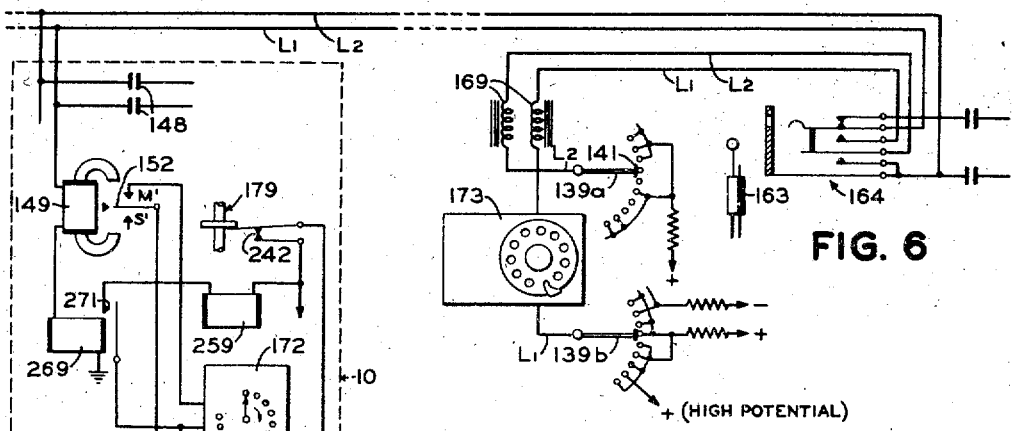
Fig. 6 shows a modification of Figs. 3 and 4.

The magnets 97 and 259 may be energized in any desired manner to effect operation of the respective stripper fingers. Fig. 6 discloses a modification of the system of Figs. 3 and 4 for obtaining selective operation of the stripper fingers in a manner to cause distribution of message sheets bearing recorded subject matter to the compartment 12 and message sheets bearing subject matter for transmission into the compartment 262. Only the modified portions of the apparatus and circuits of Figs. 3 and 4 are disclosed by Fig. 6. The switch arms 139*a* and 139*b* of the multicontact switch 138, when operated in a counterclockwise direction, cause operation of a selected machine 10 in the manner previously described. When the contact arm 139*a* reaches its twelfth stud, the stripper finger 16 is operated in the manner previously described. The contact arm 139*a* in Fig. 4 also causes operation of the stripper finger 16 when the rotary switch is operated in a clockwise direction to the fourth stud from the neutral position. In Fig. 6, the fourth contact stud which cooperates with the contact arm 139*a* is left blank, thereby to afford an opportunity for operating the stripper finger 254. This is accomplished in the modified system of Fig. 6 by providing a relay 269 which is responsive only to values of current higher than those normally flowing in the line L1 for operation of the polar relay 149. The make contact 271 of this relay completes a circuit including the peel magnet 259 from the bus bar A through the contacts 242 of the multicontact switch 179 to the bus bar B. When a higher than normal signal potential is applied to the line L1, the relay 269 will close its contacts and energize the peel magnet 259 to bring the stripper finger 254 into engagement with the copyholding cylinder 14. This higher potential is applied to the contact arm 139*b* at the fourth contact stud in a clockwise direction from the neutral position. Message sheets bearing subject matter for transmission and introduced through the chute 26 are thus removed from the copyholding cylinder 14 and distributed to the compartment 262.

While the invention has been explained in detail in connection with several illustrative embodiments thereof, it is understood that the invention may be embodied in other forms, and therefore the invention is not limited except as indicated by the terms and scope of the appended claims.

What is claimed is:

1. Automatic telegraph apparatus comprising a rotatable telegraph message sheet copyholder, means on said copyholder to receive and retain thereon for one or more revolutions a telegraph message sheet, a first means for guiding and conveying message sheets to said receiving means on said copyholder, means for automatically providing said conveying means with message sheets, a second means for guiding message sheets to said receiving means on said copyholder, said last named means having provisions for receiving message sheets inserted manually therein and means controlled by the presence of a sheet on said copyholder for preventing the guiding and conveying of a second message sheet to the receiving means on said copyholder from either said first or second means.

2. Automatic telegraph apparatus comprising a rotatable telegraph message sheet copyholder, means on said copyholder to receive and retain thereon one at a time for a plurality of revolutions telegraph message sheets, means for guiding and conveying message sheets to said receiving means on said copyholder, means for automatically providing said conveying means with message sheets, a second means for guiding message sheets to said copyholder, said last named means having provisions for receiving message sheets inserted manually therein, means for preventing operation of said automatic means and the manual inserting of a message sheet in said second guiding means when a message sheet is on said copyholder, and means for automatically removing message sheets from said copyholder.

3. Automatic telegraph apparatus comprising a rotatable telegraph message sheet copyholder, means on said copyholder to receive and retain thereon for a plurality of revolutions a telegraph message sheet, and a plurality of separate and selective electromagnetically operable means for automatically removing message sheets from said copyholder.

4. Automatic telegraph apparatus comprising a rotatable telegraph message sheet copyholder, means on said copyholder to receive and retain thereon for a plurality of revolutions telegraph message sheets one at a time, a plurality of receptacles to receive message sheets removed from said copyholder, and a plurality of selective electromagnetically operable means to selectively direct message sheets to said receptacles.

5. Automatic telegraph apparatus comprising a rotatable telegraph message sheet copyholder, means on said copyholder to receive and retain thereon for continuous rotation therewith a telegraph message sheet, a plurality of separate and selective electromagnetically operable means for automatically removing message sheets from said copyholder, and a receptacle associated with each of said message sheet removing means to receive message sheets removed from said copyholder.

6. Automatic telegraph apparatus comprising a rotatable telegraph message sheet copyholder, means on said copyholder to receive and retain for one or more revolutions a telegraph message sheet, a first means for guiding message sheets of one kind to said receiving means on said copyholder, a second means for guiding message sheets of another kind to said receiving means on said copyholder, a first means selectively operable for automatically removing message sheets of one kind from said copyholder, and a second means selectively operable for automatically removing message sheets of the other kind from said copyholder.

7. Automatic telegraph apparatus comprising a rotatable telegraph message sheet copyholder, means on said copyholder to receive and retain for one or more revolutions a telegraph message sheet, a first means for guiding message sheets of one kind to said receiving means on said copyholder, a second means for guiding message sheets of another kind to said receiving means on said copyholder, a first receptacle, a first means selectively operable for automatically removing message sheets from said copyholder and directing said removed sheets into said receptacle, a second receptacle, and a second means selectively operable for automatically removing message sheets from said copyholder and directing said removed sheets into said second receptacle.

8. In a facsimile telegraph machine, a rotatable copyholder, means including said copyholder for receiving and retaining for a plurality of revolutions telegraph message sheets one at a time, a plurality of separate electromagnetically controlled means for selectively removing said message sheets from said copyholder, a like plurality of receptacles for receiving removed message sheets and means including said separate removing means for selectively directing removed message sheets to selected ones of said receptacles.

9. In a facsimile telegraph machine, a rotatable copyholder, a plurality of separate sources of telegraph message sheets, means including said copyholder for receiving and retaining thereon for continuous rotation therewith telegraph message sheets one at a time from either one of said sources, electromagnetically controlled means for removing said message sheets from said copyholder, a plurality of message sheet receiving receptacles and means for removing and selectively directing message sheets from said copyholder to said receptacles.

10. In a facsimile telegraph machine, a rotatable copyholder, means including said copyholder for receiving and retaining thereon for continuous rotation therewith telegraph message sheets one at a time, a plurality of separate sources of telegraph message sheets, means for selectively presenting to said copyholder message sheets from said sources, means for removing said message sheets from said copyholder, a plurality of message sheet receiving receptacles, means including said removing means for removing and selectively directing message sheets from said copyholder to said receptacles and means for automatically controlling the operation of said first and last named means whereby message sheets from said sources are deposited in respective receptacles.

11. A facsimile telegraph machine comprising in combination a scanning mechanism, a movable cylindrical copyholder therefor, a plurality of means for directing copy to said copyholder, copy retaining means carried by said copyholder and actuated solely by operation thereof for securing copies thereon for scanning, and means for removing copies directed by either of said copy directing means for said holder.

RALEIGH J. WISE.